United States Patent [19]
Hanson

[11] Patent Number: 5,178,323
[45] Date of Patent: Jan. 12, 1993

[54] HEATING SYSTEM WITH SAFETY FEATURES

[75] Inventor: Larry G. Hanson, Fort Valley, Ga.

[73] Assignee: Blue Bird Body Company, Fort Valley, Ga.

[21] Appl. No.: 636,822

[22] Filed: Jan. 2, 1991

[51] Int. Cl.$^5$ ............................................. G05D 23/00
[52] U.S. Cl. ................... 237/2 A; 237/12.3 C
[58] Field of Search ............ 237/2 A, 12.3 C, 12.3 B, 237/12.3 R; 123/325, 332, 196 S

[56] References Cited

U.S. PATENT DOCUMENTS 2,815,938 12/1957 Impey et al. .
3,362,637 1/1968 Cornell ................................. 237/2 A

FOREIGN PATENT DOCUMENTS 1145204 3/1969 United Kingdom ................ 123/332

Primary Examiner—Henry A. Bennett
Attorney, Agent, or Firm—Baker & McKenzie

[57] ABSTRACT

In a large vehicle, such as a bus, a fuel-fired coolant heating system. The heating system uses a heating unit to add heat energy to the coolant, which is then circulated to heat exchangers throughout the vehicle. Safety features in the system include an impact switch which immediately stops the flow of fuel to the heating unit in the event of an accident. Another feature which contributes to safe operation of the system is the presence of a deaeration tank in the coolant flow path. The tank allows for the removal of air so that air locks can be prevented and is fitted with a pressure relief valve should overheating occur. Finally, service and inspection of the system is facilitated by attaching components of the system to a slide panel, which can be pulled out of the side of the bus. By making the components of the system easily accessible, problems are generally avoided and safety is, therefore, improved. The heating unit for use with the present invention is one which is available from Espar Products, Inc., of Mississauga, Ontario, Canada, and is known as a D 12 W diesel-fired coolant heater having a capacity fo 41,000 BTU per hour. Safety features built into the Espar heater include a flame sensor and an overheat cutout switch. The impact switch, deaerator tank and slide panel of the present invention are added safety features which make diesel-fired heaters usable in critical applications such as school buses.

4 Claims, 3 Drawing Sheets

HEATING SYSTEM WITH SAFETY FEATURES

BACKGROUND AND SUMMARY OF THE INVENTION

The present invention relates to coolant heating systems such as those which are used in large vehicles. In particular, the present invention relates to fuel burning coolant heaters of the type which are used on school buses.

Diesel-fired coolant heaters are designed to provide supplemental heat to the coolant used in water cooled engines and their related heating systems.

Auxiliary heaters are used to pre-heat coolant in cold weather situations, and are used to supplement and maintain heat energy in coolant systems of large vehicles. It is convenient to have diesel-fired coolant heaters which are capable of operating on the same diesel fuel as the engine of the vehicle. Such coolant heaters draw from the same main fuel tank as does the vehicle engine.

Since diesel fuel is highly flammable, safety is a major factor in the design of coolant heating systems. This is particularly true in the case of school buses, which are used to transport children. One of the ways in which the safety of a system can be enhanced is to make it easily accessible. By providing a system which can be easily serviced, problems which would otherwise result in accidents can be avoided.

Another possible hazard associated with diesel-fired coolant heaters is the possibility that the fuel supply line may be severed in an accident. If the fuel line is severed, and the fuel pump continues to operate, significant amounts of fuel can be spilled, resulting in a significant fire hazard.

Yet another problem associated with coolant heating systems is the presence of air in the coolant lines. The presence of air pockets may result in malfunctioning of the pumps which are used to cause coolant flow. If the pumps stall, overheating can result.

Therefore, it is an object of the present invention to provide a coolant heating system which reduces the possibility of accidents.

Another object of the present invention is to provide a coolant heating system which is easily serviced and inspected.

Still another object of the present invention is to provide a coolant heating system in which spillage of fuel is prevented in the event of an accident.

Yet another object of the present invention is to provide a coolant heating system in which air bubbles are removed from the coolant.

These and other objects and advantages of the invention are obtained with a coolant heating system in which an impact switch is used to stop the operation of a fuel pump upon a predetermined level of impact. The impact switch, which is more sensitive to lateral impact than vertical impact, is designed to stop the operation of the fuel pump when the switch is impacted.

The system includes a deaeration tank through which coolant is circulated. The deaeration tank allows air bubbles to rise to the top of the tank, while coolant is pumped from the bottom. The coolant heating system of the present invention is comprised of a heating unit which is mounted on a panel which slides in and out from a position from beneath a floor of a bus. The sliding panel allows for easy access to the components of the heating system, so that they can be easily serviced and inspected.

The objects and advantages of the invention will be better understood by reading the following specification in conjunction with the accompanying drawings.

DETAILED DESCRIPTION OF THE INVENTION

Figure 1:
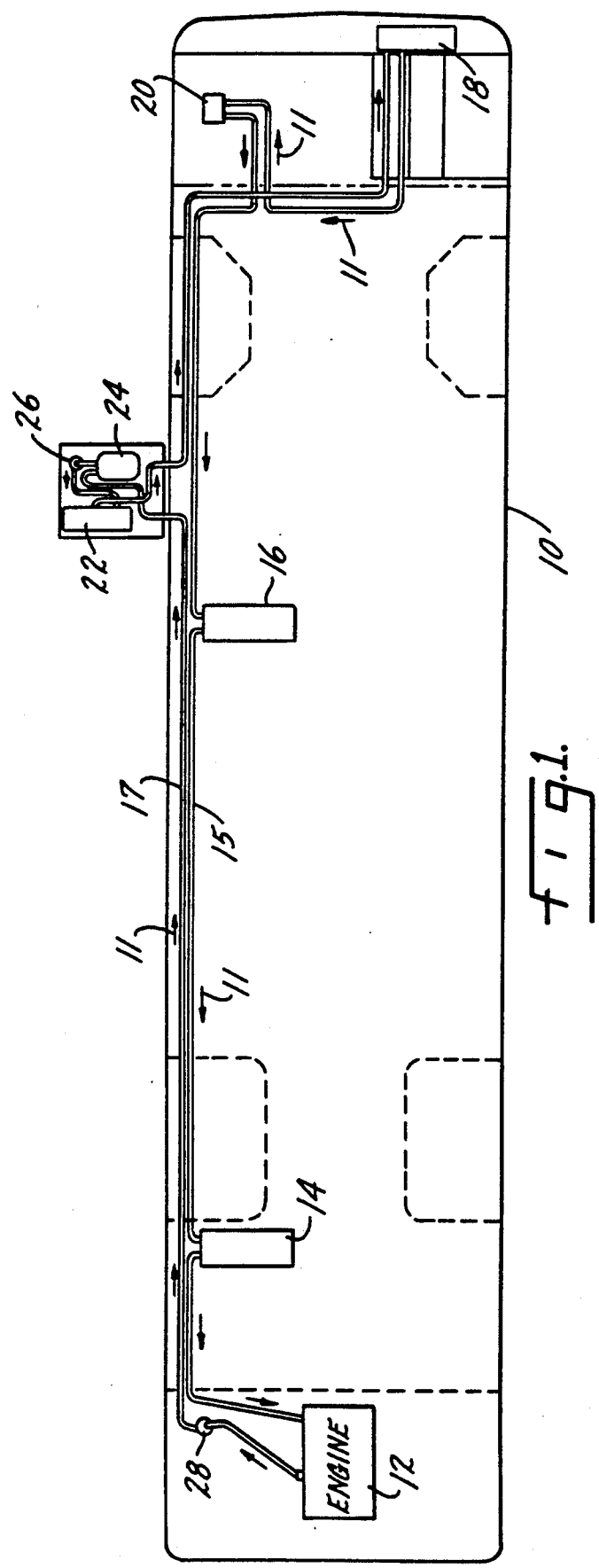
FIG. 1 is a plan view of a heating system of the present invention as installed in a large vehicle.

FIG. 1 is a plan view of a bus 10 in which the heating system of the present invention is utilized. The heating system of the present invention is shown more or less schematically in FIG. 1. The small arrows 11 show the direction of flow of coolant through the conduits 15 and 17 of the system. The engine 12 is in the rear of the bus. However, front engine buses can benefit from the heating system of the present invention. Heat exchangers 14 and 16 are used to transfer heat to the interior of the bus. A standard front heat exchanger 18 and a driver's heat exchanger 20 are located toward the front of the bus. Coolant flows from the heating unit 22 to the heat exchangers 18 and 20, and then to the heat exchangers 16 and 14. After flowing through the heat exchangers, the coolant is circulated through the engine 12 back to the heating unit 22. On its way from the engine to the heating unit, the coolant flows through the deaeration tank 24. Main pump 26 and auxiliary pump 28 cause the coolant to flow through the system.

Figure 2:
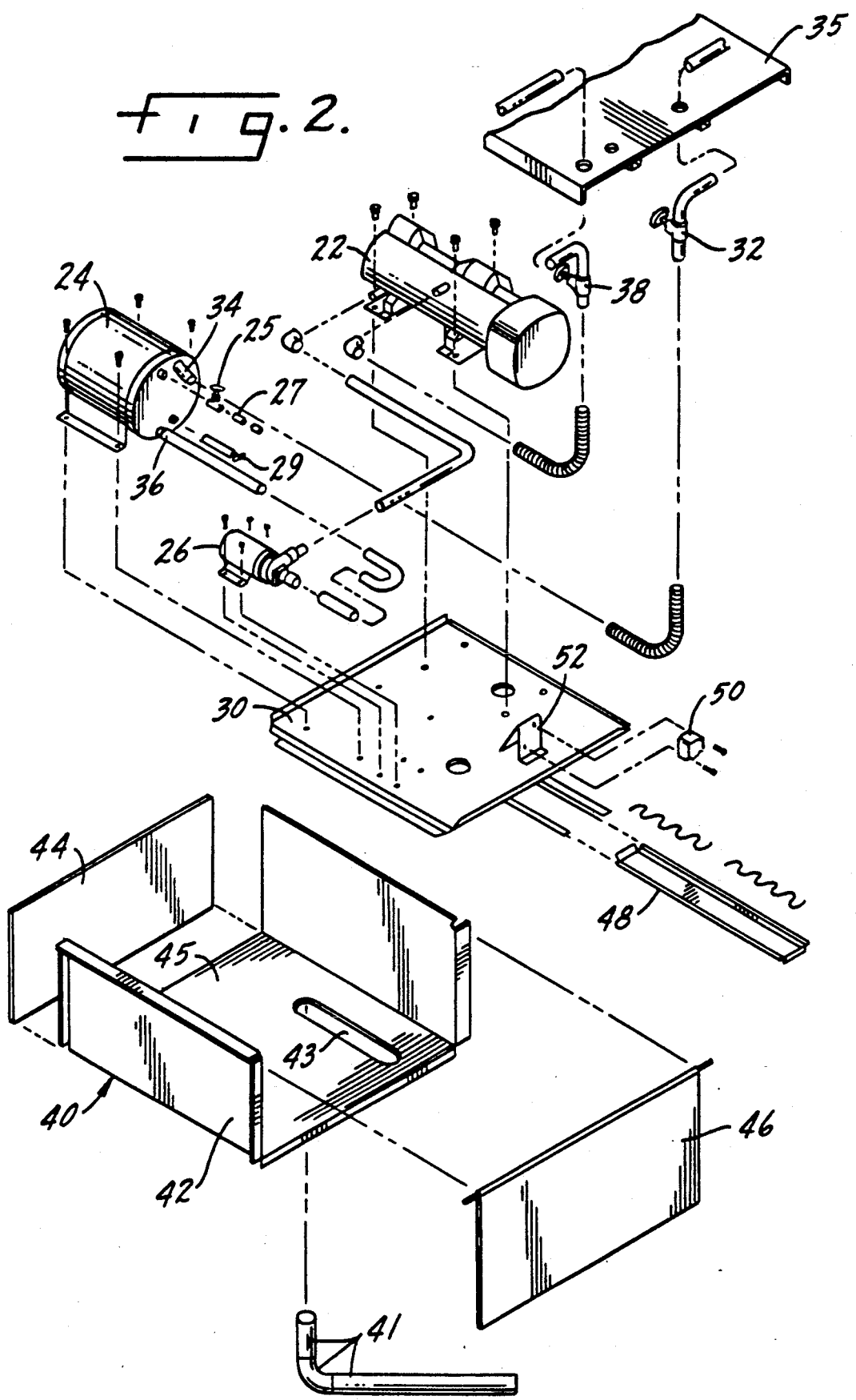
FIG. 2 is an exploded perspective view of a compartment used to house certain components of the heating system of the present invention.

FIG. 2 is an exploded view showing the way in which the heating unit 22, the deaeration tank 24, and the pump 26 are mounted to the slide panel 30. The heating unit 22 is attached to one side of the slide panel 30, and the deaeration tank 24 and the pump 26 are mounted to the other side of the slide panel 30. Coolant in need of reheating flows through the feed valve 32 into the upper inlet 34 in the deaeration tank 24. After entering the upper portion of the deaeration tank, coolant flows through the lower outlet 36 through the pump 26 to the heating unit 22. From the heating unit 22 the coolant flows through the return valve 38 to the various heat exchangers. The slide panel 30 is mounted to the housing assembly 40, which is comprised of a main support 42, a rear panel 44, and a hinged door 46. The slide panel 30 slides along the track 48 allowing the heating unit 22, the deaeration tank 24 and the pump 26 to slide laterally out of the main support to make these components easily inspected and serviced.

The deaeration tank 24 is equipped with a drain cock 25 to allow for release of gases from the top of the deaeration tank. A pressure relief valve 27 opens if pressure in the tank 24 reaches 50 psi. A drain cock 29 allows for drainage of coolant from the tank.

The feed valve 32 and return valve 38 each pass through the underside of the floor 35 of the vehicle. The valves 32 and 38 are connected to the tank 24 and heating unit 22, respectively, by flexible hoses so that the slide panel can move laterally without the need to disconnect the various components of the system and allowing the system to be operated in the easily accessible position.

Exhaust from the heating unit 22 is directed through the exhaust pipe components 41. The exhaust pipe components 41 extend through a slot 43 formed in the bottom panel 45 of the housing assembly 40. Thus, the heating unit is free to slide laterally with the slide panel 30 for servicing and inspection.

FIG. 2 also shows the impact switch 50, carried by the mounting bracket 52. The switch 50 is sensitive to impact, and automatically stops the flow of fuel to the heating unit when the bus 10 is impacted, such as in an accident. To avoid unintended actuation of the impact switch, it is disposed to be more sensitive to lateral acceleration than to vertical acceleration. Thus, travel over a bumpy road will not cause the flow of fuel to stop, whereas a moderate lateral impact will. A switch, model GU 138 RB, sold by First Inertia Switch, of Fleet, Hampshire, England, has been found to be a suitable switch for use in practicing the present invention.

Figure 3:
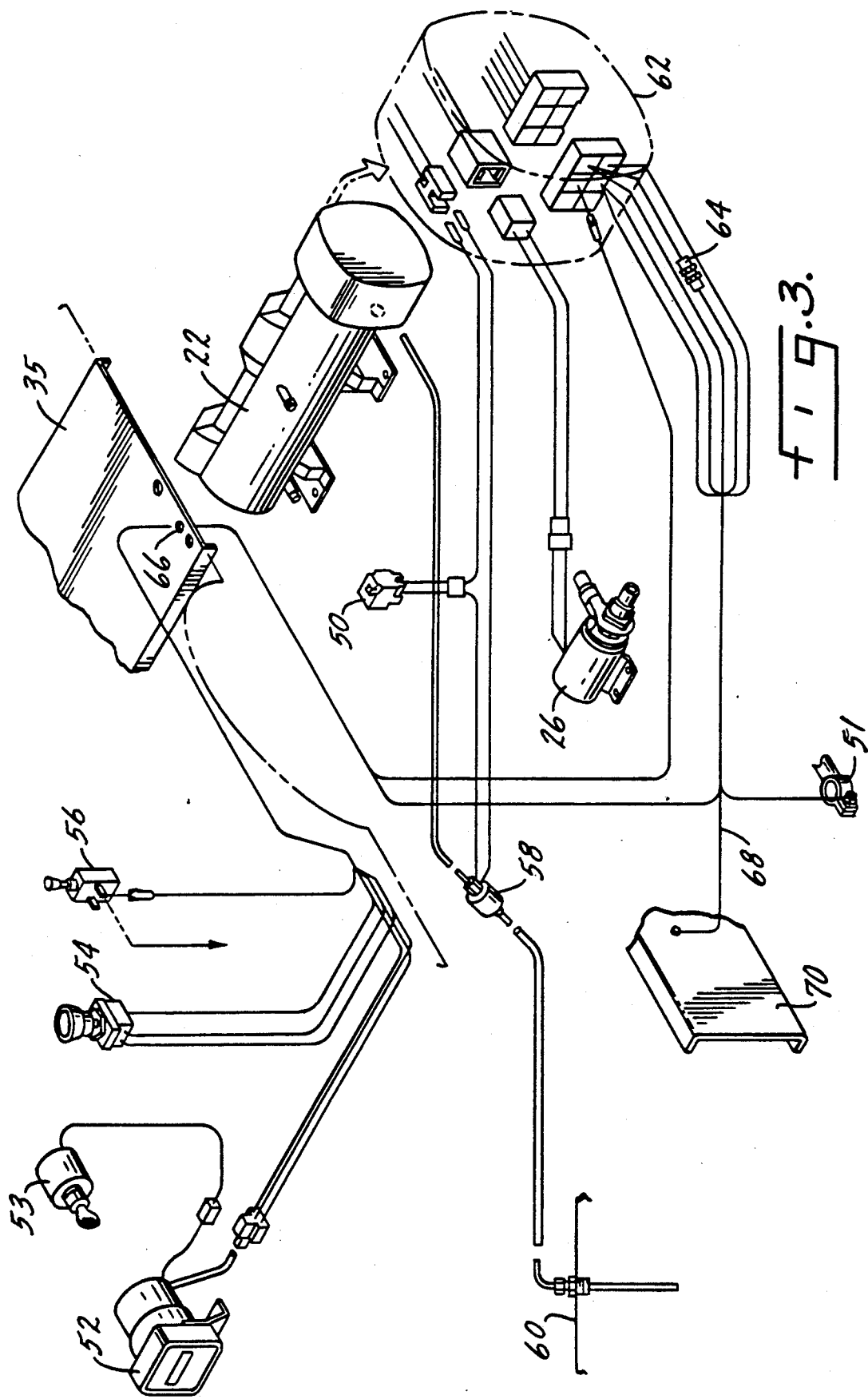
FIG. 3 is a schematic perspective view of the wiring of the heating system of the present invention.

FIG. 3 is a schematic diagram which shows the wiring of the heating system of the present invention. Power is supplied to the system from the positive battery terminal 50. A timer 52 may be used to turn on the heating system prior to full operation of the bus 10. The timer may be used to schedule start-up of the system. For example, during cold weather, the system can be scheduled to begin operation the night before the bus is to be used. However, operation of the heating system without running the engine should only be done for about one hour, and should only be done without use of blowers and other electrical devices to avoid draining the battery. If a timer 52 is not used, a lighted push/pull switch 54 may be used to turn on the system. The main coolant pump 26 operates at all times when the system is operating, and the two position switch 56 will operate the main pump and the auxiliary pump independently of the heater system for augmentation of engine coolant pump capacity, if so desired.

Fuel pump 58 draws fuel from the fuel tank 60 and sends it to the heating unit 22. The inertial impact switch 50 is wired to the fuel pump, and shuts down the fuel pump when the bus 10 is impacted. The set of wiring components 62 is housed within the heating unit 22, and includes a fuseholder 64. Wiring from the timer 52 and ignition switch 53 (or the push/pull switch 54 and auxiliary pump switch 56) extend through an opening 66 in the bus floor to the heating unit 22. A grounding wire 68 extends from the heating unit 22 to the chassis frame rail 70.

By providing a heating system which is mounted on a sliding panel to provide easy access to the components of the system, problems which arise from lack of maintenance are better avoided. Also, the presence of the impact switch 50, which immediately cuts off the flow of fuel to the heating unit in the event of an accident, makes the unit quite safe. In addition, the presence of the deaeration tank 24, which prevents the presence of air pockets in the coolant lines, adds significantly to the safe operation of the heating system of the present invention.

Large vehicles such as buses are difficult to heat, and auxiliary heating systems present significant problems from a safety standpoint. This is particularly important in the case of buses where the lives of many people are involved. It is believed that the safety aspects of the system of the present invention make this heating system safe and effective.

An additional benefit which results from the use of the heating system of the present invention is the fact that the coolant which runs through the engine can be hotter than the coolant would otherwise be. By using an auxiliary coolant heater, the engine coolant maintains the engine at a warmer temperature at which it will run more efficiently. In buses which do not use an auxiliary heater, so much heat is removed from the engine coolant that the performance of the engine suffers, because it runs at a lower temperature.

While a specific embodiment of the invention has been shown and described, it will be apparent to those skilled in the art that numerous alternatives, modifications, and variations of the embodiment shown can be made without departing from the spirit and scope of the appended claims.

I claim:

1. A heating system for a bus, having a bus body, said system comprising a fluid circulation system and a fluid heating system, said fluid circulation system comprising a fuel line, a fuel pump and a heating unit, said fluid heating system including switch means connected to said fuel pump for turning off said fuel pump when said vehicle experiences forces resulting from impact, said system having moveable support means for moving said heating unit relative to said bus body, said moveable support means comprising a retractable panel carrying said heating unit, said panel being moveable into and out of a compartment.

2. A heating system in accordance with claim 1 wherein:
   said system includes fluid reservoir means to allow gases to escape from liquid in said heating system, and to provide a reservoir of heated fluid to prevent said system from excessively cycling on and off and to provide a safety valve to relieve excess pressure in the event of overheating.

3. A heating system in accordance with claim 2 wherein:
   said heating unit and said switch means are mounted on moveable support means for allowing service and inspection of said switch means and said heating unit.

4. A heating system in accordance with claim 3 wherein:
   a cover over said compartment is movably attached to said vehicle to allow access to said heating unit with coolant for controlling temperatures in said engine.

* * * * *